No. 735,817. PATENTED AUG. 11, 1903.
S. S. PRIDHAM.
APPARATUS FOR THE PURIFICATION OF WATER.
APPLICATION FILED JULY 20, 1901.
NO MODEL. 2 SHEETS—SHEET 2.
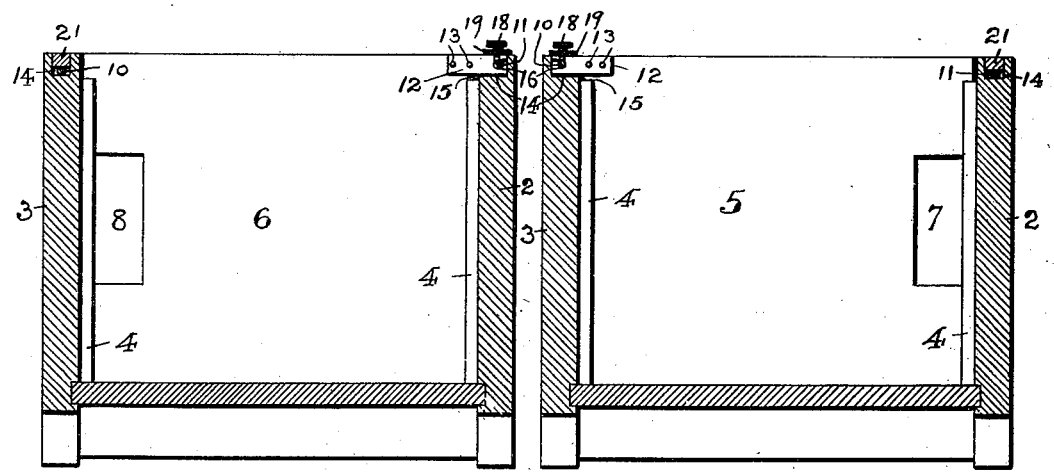
FIG. 4. FIG. 5.
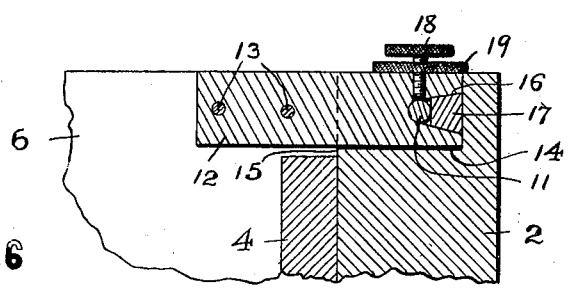
FIG. 6.
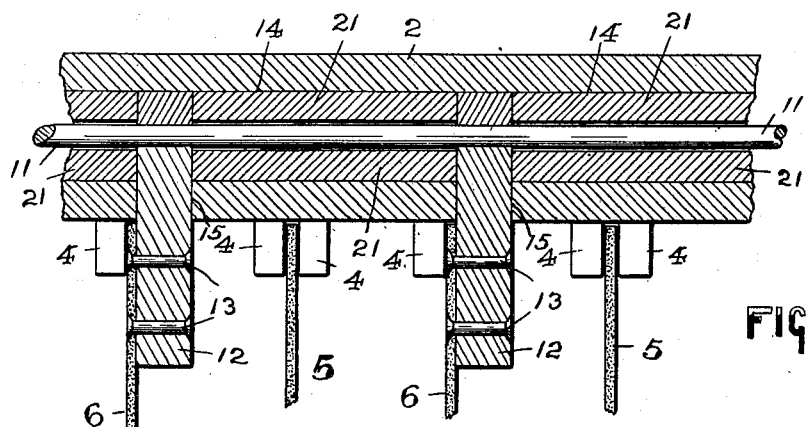
FIG. 7.
FIG. 8.
WITNESSES: Geo. A. Richards, E. Van Ness.
INVENTOR: Samuel S. Pridham,
BY Fred K. Fraentzel
ATTORNEY No. 735,817. Patented August 11, 1903.

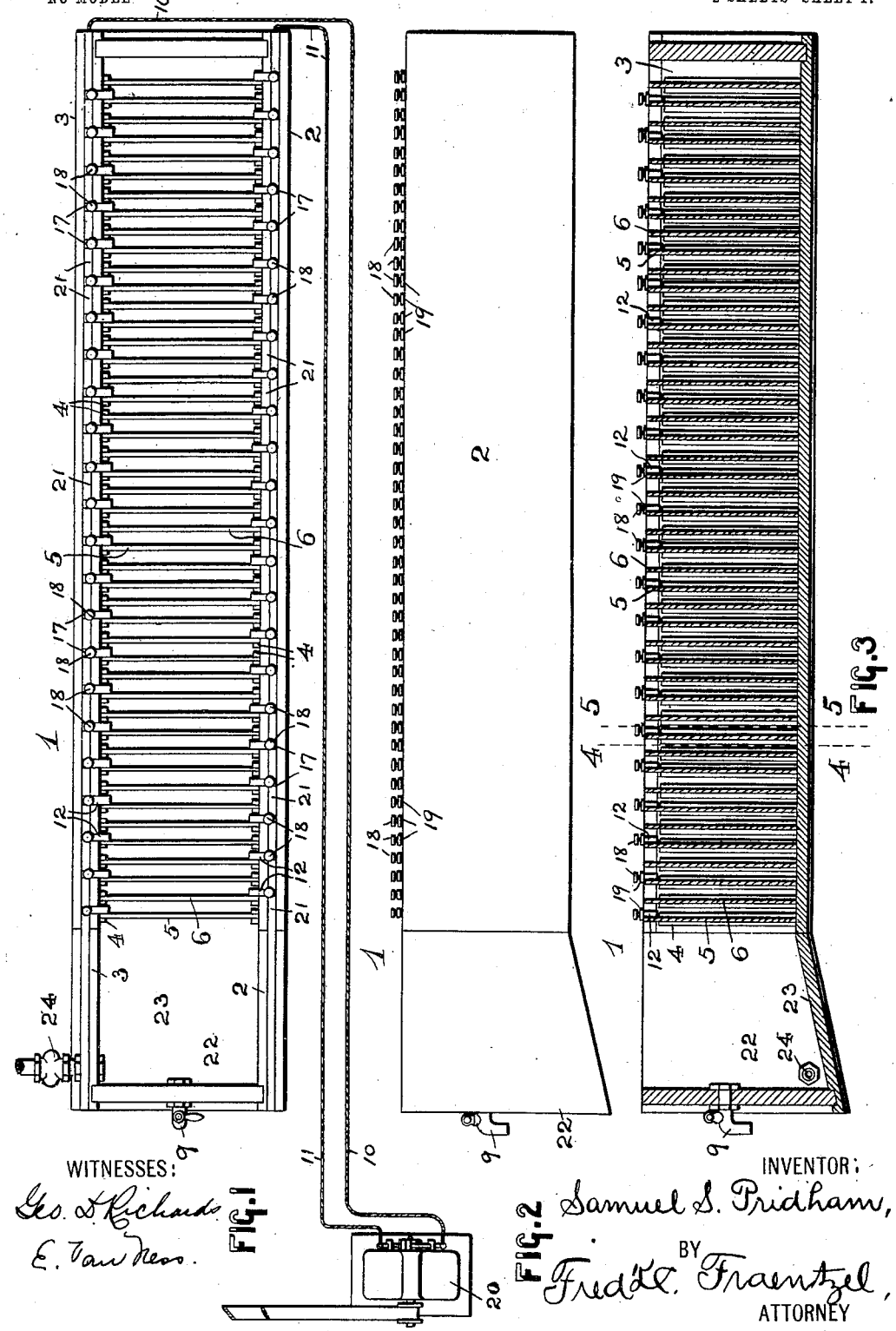

UNITED STATES PATENT OFFICE.

SAMUEL S. PRIDHAM, OF NEWARK, NEW JERSEY.

APPARATUS FOR THE PURIFICATION OF WATER.

SPECIFICATION forming part of Letters Patent No. 735,817, dated August 11, 1903.

Application filed July 20, 1901. Serial No. 69,021. (No model.)

*To all whom it may concern:*

Be it known that I, SAMUEL S. PRIDHAM, a citizen of the United States, residing at Newark, in the county of Essex and State of New Jersey, have invented certain new and useful Improvements in Apparatus for the Purification of Water and Defecation of Sewage; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention relates to a novel construction of apparatus and electrode for the purification of water and also for the defecation of sewage and other matter; and the invention has for its primary object to provide a simple and inexpensive apparatus and electrodes therefor for eliminating from water all deleterious substances and matter, thereby rendering the water potable and capable of advantageous uses in the arts, and, furthermore, to provide an apparatus and electrodes therefor for the purpose of treating sewage and other matter by subjecting such matter to a current of electricity applied by means of the electrodes, which are hereinafter more fully described, fully destroying the animal and vegetable compounds in solution or suspension and causing the destruction of bacteria and other micro organisms.

A further object of this invention is to provide an electrode consisting of an alloy of magnesium and aluminium whereby a practical and efficient electrode is produced for rendering impure water fit for use in the arts by the elimination of mineral matter in solution or suspension and also rendering the water fit for drinking purposes.

Various attempts have been made to purify water and other matter by the use of electrolytic processes utilizing electrodes—such as zinc, iron, and carbon—as anodes of the electric circuit, and it has been found that the use of these electrodes results in the formation of oxids or oxhydrates of the metals employed, and the salts formed from them go into solution in the water treated. Many of these compounds so formed are deleterious. Electrodes composed of manganese dioxid and carbon have also been employed; but I have found by practical demonstration that with constant use the carbon becomes separated from the manganese dioxid and is then held in suspension in the water, which is thereby turned dark and is rendered unfit for further use.

I have found by practical demonstration that an efficient electrode for obtaining the best results should consist of an alloy of magnesium and aluminium, preferably in the proportions of about ninety-five per cent. of the magnesium and about five per cent. of the aluminium, the quantity of the aluminium of necessity being slight, so that there may be the least possible resistance offered to the electricity passing through the electrodes and the water or other matter which is to be purified.

My invention therefore consists, primarily, in the novel electrode, consisting of an alloy of magnesium and aluminium; and, furthermore, my invention consists in the novel construction of apparatus hereinafter set forth and in the several novel arrangements and combinations of the parts thereof, as well as in the details of the construction of said parts, all of which will be fully described in the accompanying specification and then finally embodied in the clauses of the claim.

The invention is clearly illustrated in the accompanying drawings, in which—

Figure 1 is a plan or top view of an apparatus constructed in accordance with my invention. Fig. 2 is a side view of the same; and Fig. 3 is a longitudinal vertical section of the apparatus, illustrating in a general way the arrangement of the electrodes within the water-tank or runway of the apparatus. Fig. 4 is a vertical cross-section of the apparatus, said section being taken on line 4 4 in Fig. 3 and said view illustrating the preferred form of electrode forming the anode and showing the electrical means of connection between each plate and the positive circuit-wire arranged in the one edge of the tank or runway. Fig. 5 is a similar section of the apparatus, said section being taken on line 5 5 in said Fig. 3, said view illustrating the preferred form of electrode forming the cathode and showing the manner of electrical connection between it and the negative wire arranged in the other edge of the tank or runway. Fig. 6 is a detail vertical section of the electrical connections illustrated in connection with the electrodes represented in said Figs. 4 and 5. Fig. 7 is a horizontal section through a portion of one side of the tank or runway and the electrical connections between the electrodes and the circuit-wire, and Fig. 8 is a vertical section through a portion of the said edge of the tank or runway and the electrical connection between the electrode and the circuit-wire.

Similar numerals of reference are employed in all of the said above-described views to indicate corresponding parts.

In the said drawings, 1 represents a tank or runway, which may be made of any suitable material, preferably wood or other nonconductor of electricity, of sufficient length and width that the water or other matter to be purified, which is admitted at the one end and discharged at the other end, will be brought in contact with enough surface of the electrodes to insure defecation and purification by the action of the current of electricity passed through the electrodes with which the water or other matter is in contact. The said tank or runway 1 is provided on the inner surfaces of the longitudinal sides 2 and 3 with cleats 4, between which are removably arranged the several electrodes forming the alternately-disposed cathodes 5 and the anodes 6. The said electrodes are of a size that they rest upon the bottom of the tank or runway and fit snugly between the cleats 4 on the inner surfaces of the said sides 2 and 3, the cathodes 5 being formed with the openings 7 at the one side of each plate midway, or approximately so, between the top and bottom of each plate and the anodes 6 being provided with correspondingly-formed openings 8 at the opposite side of the plate midway, or approximately so, between the top and bottom of each plate, as clearly illustrated in Figs. 4 and 5 of the drawings. These electrodes are composed of an alloy of magnesium and aluminium, preferably in the proportion of about ninety-five per cent. of the magnesium to five per cent. of aluminium, and are made with the said openings 7 and 8, preferably as illustrated, to allow of the free passage of water or other matter to be purified about the several electrodes in a sinuous path, first from the one side of the tank or runway to the opposite side between two electrodes and then in an opposite direction in the space between the next two plates or electrodes, and so on, alternating from side to side, as will be clearly evident. It will thus be seen that the water or other material to be treated, which is admitted at one end of the tank or runway 1 and allowed to flow out at the other end of the tank or runway through a pipe or spigot 9, will be caused to take a tortuous path or course, thereby coming in close contact with the greatest amount of electrode-surface and insuring the most thorough treatment by the current of electricity which passes through the electrodes.

In order that electrical contact may be established on one side with the circuit-wire 10 and with the anodes and upon the opposite side with the return circuit-wire 11 and the cathodes, each electrode is provided with a contact plate or piece 12 of copper or other suitable material. The contact plates or pieces 12 are secured in their proper positions upon the respective electrodes by means of rivets or pins 13 or any other suitable fastening means.

In the upper edge of each longitudinal side 2 and 3 of the tank or raceway 1, as will be seen from Figs. 4 to 8, inclusive, is a groove or channel 14, into which the said circuit-wires 10 and 11 are placed, one in each side of the tank, as shown. At right angles to the said grooves or channels 14 in the respective sides 2 and 3 are suitably-disposed channels 15, which establish communication between said grooves or channels 14 with the inner space of the tank or runway 1. When the several electrodes are placed in position in the tank or runway, the contact plates or pieces 12 of the anodes are arranged in the channels 15 of the side 2 and extend directly across the longitudinal groove or channel 14 in said side 2, and the contact plates or pieces 12 of the cathodes are arranged in the channels 15 of the side 3 and extend directly across the longitudinal groove or channel 14 in the said side 3, with the upper edges of the said plates or pieces 12 preferably made flush with the upper edges of the said sides 2 and 3 of the tank or runway 1.

In order that proper electrical contact may be made between the several plates or pieces 12 with the wires 10 and 11, each plate or piece 12 is cut away, as at 16, for the insertion of a metal block 17 for holding the circuit-wires in position substantially as illustrated, a binding-screw 18 and binding-nut 19 being employed with each contact plate or piece 12 for positively forcing the wires in close electrical contact with the respective contact plates or pieces 12. This arrangement of the electrodes and the manner of their electrical connections permit of the removal of any one or more electrodes from the tank or runway 1 if found necessary or for the electrical disconnection of the electrodes with the said circuit-wires 10 and 11. These wires, as will be seen from Fig. 1, extend from the one end of the tank or runway 1 and are connected with the respective poles of a dynamo 20 or any other suitable source of electrical energy.

The spaces between the several contact plates or pieces 12 in the longitudinal grooves or channels 14, formed in the upper edges of the sides 2 and 3 of the tank or runway, are closed, preferably, by means of blocks of wood 21 or other suitable non-conductor of electricity, whereby the upper edges of the tank or runway are entirely closed, with the circuit-wires inclosed within the sides of the tank and nothing extending above the upper edges of the said sides 2 and 3 except the binding-screws 18 and the nuts 19 on said screws.

Although the hereinabove-described arrangement of contact plates or pieces 12 and the circuit-wires 10 and 11, concealed within the grooved or channeled edges of the sides 2 and 3 or the tank or runway, is the preferred manner of establishing electrical contact, still I do not intend to limit myself to this arrangement of the several parts, and the several electrodes may be electrically connected with the said circuit-wires in any other suitable manner and with the said wires 10 and 11 exposed, if desired.

The tank or runway is provided at the lower end piece with an outlet in the form of a pipe or a cock 9, preferably placed in the middle of said end piece for drawing off the pure and potable water or other liquid matter which has been purified.

The lower end portion 22 of the tank or runway 1 is usually made as herein shown, forming a chamber which is provided with an inclined bottom 23 and is provided at its lowest point with an outlet 24 of any suitable construction, preferably in the form of a valve. Into this chamber 22 can be forced from time to time by any suitable means, as stirring the liquid between the electrodes or by raising the electrodes from their positions in the tank or runway, all sediment and scum and then washed out through the open valve or outlet 24.

From the above description of my invention it will be evident that I have devised a simple and operative apparatus for the electrolytic treatment of water and other matter and I have secured an electrode in which the electrical resistance has been greatly reduced and common polluted river-water containing large amounts of animal and vegetable matter is rendered potable in a very short time, requiring but a slight rate of amperage per minute and per gallon of water, while of course with water or other matter containing large amounts of the salts of lime, iron, magnesium, or other metals a greater amount of amperage per minute and per gallon becomes necessary.

Having thus described my invention, what I claim is—

1. In an apparatus for the purification of water and other matter, a tank or runway, having grooves or channels in its sides, electrodes in said tank or runway, contact plates or pieces on said electrodes extending in a lateral direction into and across the said grooves or channels, circuit-wires in said grooves or channels connected with said contact plates or pieces, and means for closing the spaces between said contact plates or pieces, arranged directly above the exposed portions of said circuit-wires, substantially as and for the purposes set forth.

2. In an apparatus for the purification of water and other matter, a tank or runway, having grooves or channels in its sides, electrodes in said tank or runway, contact plates or pieces on said electrodes extending in a lateral direction into and across the said grooves or channels, circuit-wires in said grooves or channels connected with said contact plates or pieces, and means for closing the spaces between said contact plates or pieces, arranged directly above the exposed portions of said circuit-wires, consisting, essentially, of blocks of wood or other insulating material forced into said spaces and held in engagement with the sides of the said grooves or channels, substantially as and for the purposes set forth.

3. In an apparatus for the purification of water and other matter, a tank or runway, having grooves or channels in the sides, electrodes in said tank or runway, contact plates or pieces on said electrodes extending in a lateral direction into said grooves or channels, each contact-plate having an opening, a metal block in each opening, and circuit-wires passed through the said openings in the contact plates or pieces and held in place by said blocks, substantially as and for the purposes set forth.

4. In an apparatus for the purification of water and other matter, a tank or runway, having grooves or channels in the sides, electrodes in said tank or runway, contact plates or pieces on said electrodes extending in a lateral direction into said grooves or channels, each contact-plate having an opening, a metal block in each opening, circuit-wires passed through said openings in the contact plates or pieces and held in place by said blocks, a binding-screw connected with each contact plate or piece for forcible engagement with the said circuit-wires, and means for closing the spaces between said contact plates or pieces arranged directly above the exposed portions of said circuit-wires, substantially as and for the purposes set forth.

5. In an apparatus for the purification of water and other matter, an electrode consisting of ninety-five per cent. of magnesium and five per cent. of aluminium, substantially as and for the purposes set forth.

In testimony that I claim the invention set forth above I have hereunto set my hand this 16th day of July, 1901.

SAMUEL S. PRIDHAM.

Witnesses:
FREDK. C. FRAENTZEL,
GEO. D. RICHARDS.